United States Patent
Sengupta et al.

(10) Patent No.: US 9,804,857 B2
(45) Date of Patent: Oct. 31, 2017

(54) METHOD AND APPARATUS FOR MULTI-MODE MOBILE COMPUTING DEVICES AND PERIPHERALS

(75) Inventors: Uttam K. Sengupta, Portland, OR (US); Shreekant S. Thakkar, Portland, OR (US); Bruce L. Fleming, Morgan Hill, CA (US); Uma M. Gadamsetty, Chandler, AZ (US); Arvind Mandhani, San Francisco, CA (US); Shane D. Wall, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 583 days.

(21) Appl. No.: 12/971,174

(22) Filed: Dec. 17, 2010

(65) Prior Publication Data

US 2012/0159144 A1    Jun. 21, 2012

(51) Int. Cl.
| G06F 9/44 | (2006.01) |
| G06F 13/40 | (2006.01) |
| H04B 1/3877 | (2015.01) |
| H04B 1/3883 | (2015.01) |

(52) U.S. Cl.
CPC ............ *G06F 9/4408* (2013.01); *G06F 9/441* (2013.01); *G06F 13/4081* (2013.01); *H04B 1/3877* (2013.01); *H04B 1/3883* (2013.01); *Y02B 60/1228* (2013.01); *Y02B 60/1235* (2013.01)

(58) Field of Classification Search
CPC .............................. G06F 9/4408; G06F 9/441
USPC .................................. 713/100, 300, 320, 324
See application file for complete search history.

(56) References Cited

U.S. PATENT DOCUMENTS

| 6,795,912 | B1* | 9/2004 | Itoh et al. .......................... 713/2 |
| 7,231,531 | B2* | 6/2007 | Cupps et al. ................. 713/322 |
| 7,343,484 | B2* | 3/2008 | Du et al. ............................ 713/2 |
| 2003/0110331 | A1* | 6/2003 | Kawano et al. ................. 710/58 |
| 2003/0204708 | A1* | 10/2003 | Hulme et al. ..................... 713/1 |
| 2005/0216722 | A1* | 9/2005 | Kim et al. ......................... 713/2 |
| 2006/0085794 | A1* | 4/2006 | Yokoyama .......... G06F 9/45537 718/100 |
| 2006/0282698 | A1* | 12/2006 | Andreas et al. ................... 714/4 |
| 2008/0148034 | A1* | 6/2008 | Henry et al. ...................... 713/1 |
| 2008/0162914 | A1* | 7/2008 | Adrangi et al. ................... 713/2 |
| 2008/0244598 | A1* | 10/2008 | Tolopka et al. ............... 718/104 |
| 2009/0063845 | A1* | 3/2009 | Lin .............................. 713/100 |
| 2010/0180273 | A1* | 7/2010 | Harris .............................. 718/1 |
| 2011/0016299 | A1* | 1/2011 | Galicia et al. .................... 713/1 |

(Continued)

OTHER PUBLICATIONS

Clock Gating dictionary defintion, http://www.webopedia.com/TERM/C/clock_gating.html, Dec. 29, 2004.*

*Primary Examiner* — Kim Huynh
*Assistant Examiner* — Brandon Kinsey

(57) ABSTRACT

Embodiments of a method and apparatus are described for operating a mobile computing device in different modes using different operating systems. An apparatus may comprise, for example, a memory operative to store multiple operating systems, a processor operative to execute the multiple operating systems, an operating system management module operative to select a first operating system when the mobile computing device is in a first mode or a second operating system when the mobile computing device is in a second mode and the mobile computing device is coupled to one or more external devices. Other embodiments are described and claimed.

23 Claims, 5 Drawing Sheets

(56) References Cited

U.S. PATENT DOCUMENTS

2011/0022832 A1\* 1/2011 Motohama et al. .............. 713/2
2012/0005691 A1\* 1/2012 Wong et al. .................. 719/319

\* cited by examiner

METHOD AND APPARATUS FOR MULTI-MODE MOBILE COMPUTING DEVICES AND PERIPHERALS

BACKGROUND

The performance of modern mobile computing systems has increased rapidly in recent years. One particular area in which performance has evolved is processor technology. Many processors in modern mobile computing systems include a wide processing range capable of executing any number of different applications, including operating systems that previously could only be executed by more powerful processors included in larger computing systems. The increase in processing power provided by modern processors and the increased processing demands associated with users' increased expectations for mobile computing system performance has resulted in increased power consumption for mobile computing systems that continue to decrease in size. As the processing power continues to increase and usage models continue to expand for mobile computing systems, reductions in power consumption and increased functionality become important considerations. As a result, it is desirable to adapt mobile computing systems to accommodate a wide range of computing capabilities. Consequently, there exists a substantial need for techniques to operate mobile computing systems in multiple modes using a plurality of operating systems.

DETAILED DESCRIPTION

Figure 1A:
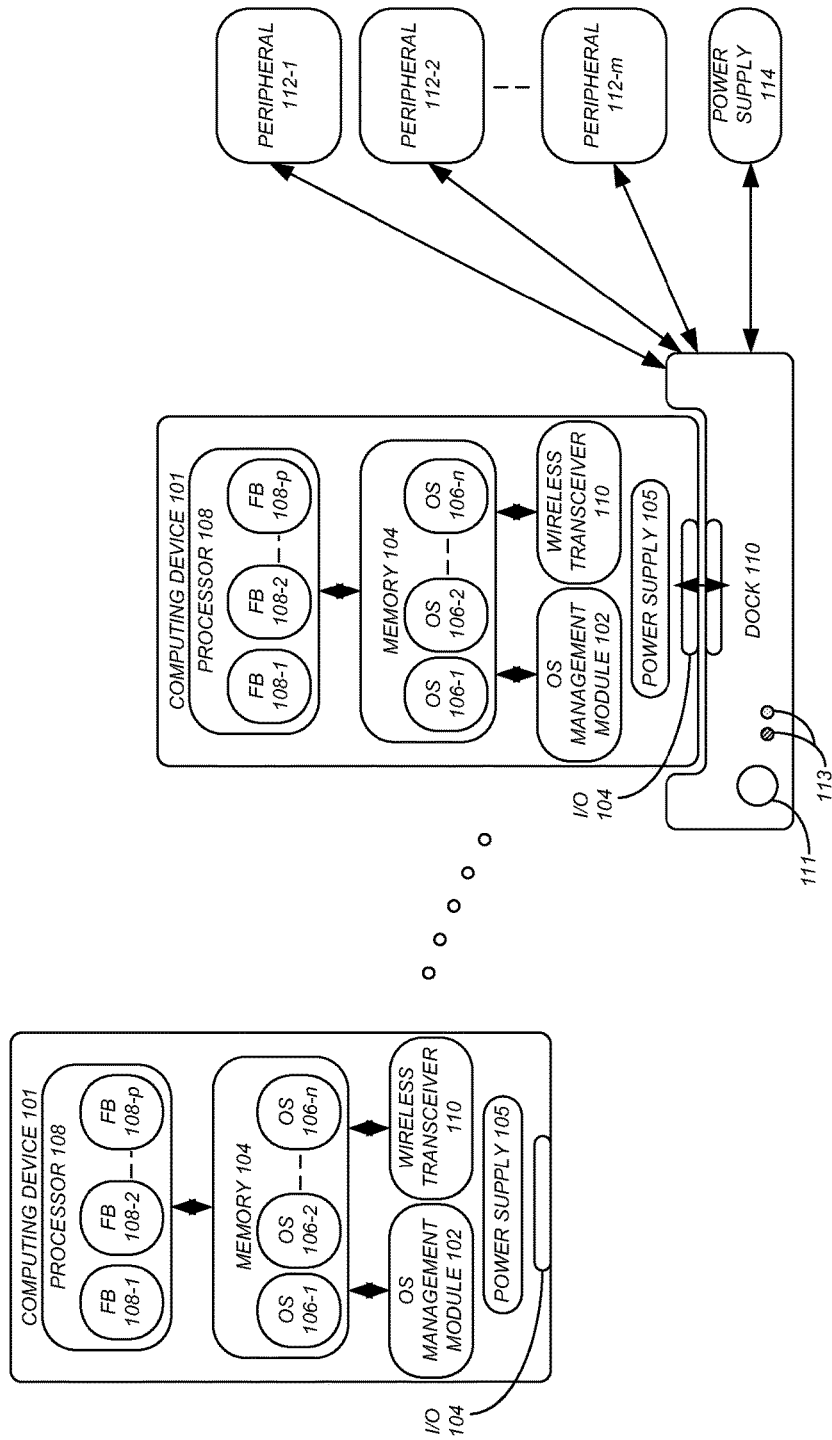
FIG. 1A illustrates one embodiment of a first system.

The embodiments are generally directed to techniques designed to enhance the performance of mobile computing devices. Various embodiments provide techniques that include a mobile computing device that is operative to store and execute both a mobile operating system (OS) and a desktop OS. For example, one embodiments may comprise an apparatus having a memory operative to store multiple operating systems, a processor operative to execute the multiple operating systems and an operating system management module operative to select a first operating system when the mobile computing device is in a first mode or a second operating system when the mobile computing device is in a second mode and the mobile computing device is coupled to one or more external devices. Other embodiments are described and claimed.

With the progression over time toward the use of mobile computing devices for everyday computing, demands and performance expectations associated with mobile computing devices have steadily risen. Unfortunately, despite the increased functionality of modern mobile computing devices, users today are often forced to carry multiple devices to perform a number of desired tasks. For example, a user may utilize both a smartphone and a laptop or desktop computer because, while convenient and powerful, the smartphone may not be capable of executing certain applications or it may simply be more convenient or user friendly to execute certain applications using the larger form factor and peripherals available for use with a laptop or desktop computer.

In addition to the increased functionality demands, the computing power required to perform certain tasks on mobile computing devices has also increased. For example, many tasks associated with everyday computing, such as editing a word processing document, continue to be performed on larger computing devices when available because the demands placed on the processor of a mobile computing device may be too great and the screen size of a mobile computing device may not be adequate for this type of task. Additionally, mobile computing devices such as smartphones often run different or limited operating systems when compared to laptop and desktop computers. The mobile operating system limitations may, in some embodiments, artificially limit the processing power available in a mobile computing device.

It may be advantageous, in some embodiments, for a mobile computing device to function in different modes. For example, a mobile computing device may function as a smartphone when in a phone mode and may be docked or otherwise coupled to any number of peripherals and may thereafter function in a docked mode and provide enhanced functionality. In some embodiments, the separate modes may enable the execution of separate operating systems that provide different levels of functionality and may also allow for the control of one or more processors to ensure appropriate processing power availability, power consumption and thermal management in each mode. Current computing devices may be operative to drive external peripherals through us of a dock or other means, but these current systems do not change operating systems or modes to accommodate the external peripherals and the additional usage models. Rather, current systems simply provide control or display of the existing mobile OS on a larger scale. Consequently, the improvements described herein are needed.

Embodiments may include one or more elements, nodes or modules. An element, node or module may comprise any structure arranged to perform certain operations. Each element, node or module may be implemented as hardware, software, or any combination thereof, as desired for a given set of design parameters or performance constraints. Although embodiments may be described with particular elements, nodes or modules in certain arrangements by way of example, embodiments may include other combinations of elements, nodes or modules in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

FIG. 1A illustrates one embodiment of a system. FIG. 1A illustrates a block diagram of a system 100. System 100 may comprise a computing system in some embodiments. As shown in FIG. 1A, system 100 comprises multiple devices or elements, such as computing device 101, dock 110, peripherals 112-1-m and power supply 114. Separate embodiments of computing device 101 are illustrated in FIG. 1A to show the computing device 101 operating independently (on the left) and coupled to dock 110 (on the right). It should be understood that the separate embodiments of computing device 101 in FIG. 1A may comprise the same computing device 101. In some embodiments, computing device 101 may include processor 108 having functional blocks 108-1-$p$, memory 104, operating systems 106-1-$n$, OS management module 102, wireless transceiver 110, power supply 105 and input/output (I/O) connector 104. In various embodiments, the variables n, m and p used throughout may represent any positive integer value and the variables may represent the same or different variables. The embodiments are not limited to the elements or the configuration shown in this figure. Further details of one embodiments of a mobile computing device 101 are discussed below with reference to FIG. 4.

In various embodiments, processor 108 may comprise a multi-core processor or a central processing unit comprising one or more functional blocks 108-1-$p$. Functional blocks 108-1-$p$ may comprise a semiconductor core, IP core, or IP block comprising a reusable unit of logic, cell, or chip layout design of processor 108. The processor 108 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, functional blocks 108-1-$p$ may comprise logical and/or virtual processor cores. Each logical processor core 108-1-$p$ may include one or more virtual processor cores in some embodiments. For example, each processor core 108-1-$p$ may include two virtual cores resulting in a total of eight available cores for multi-core processor 108. Other embodiments are described and claimed.

Transceiver 110 may comprise one more wireless interfaces and/or components for wireless communication such as one or more transmitters, receivers, transceivers, chipsets, amplifiers, filters, control logic, network interface cards (NICs), antennas, antenna arrays, modules and so forth. Examples of conventional antennas may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, while not shown in FIG. 1A, the computing device 101 may comprise or form part of a wireless network. In some embodiments, for example, the wireless network may comprise or be implemented as various types of wireless networks and associated protocols suitable for a WPAN, a Wireless Local Area Network (WLAN), a Wireless Metropolitan Area Network, a Wireless Wide Area Network (WWAN), a Broadband Wireless Access (BWA) network, a cellular network, a radio network, a television network, a satellite network such as a direct broadcast satellite (DBS) network, a long term evolution (LTE) network and/or any other wireless communications network configured to operate in accordance with the described embodiments.

In some embodiments, power supply 105 may comprise a battery, fuel cell or other internal power supply operative to provide power for computing device 101 when the device is not connected to an external device. For example, power supply 105 may comprise a lithium-ion battery in some embodiments.

In various embodiments, memory 104 may comprise any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Operating systems (OSs) 106-1-$n$ may comprise an interface between various hardware components of computing device 101 or peripherals 112-1-$m$ and a user in some embodiments. In various embodiments, OSs 106-1-$n$ may be responsible for the management and coordination of activities and the sharing of the resources of the computing device 101. In some embodiments, OSs 106-1-$n$ may act as a host for a variety of computing applications to run or execute on computing device 101, such as a media application, for example.

In various embodiments, OSs 106-1-$n$ may comprise one or more of a mobile OS and a desktop OS in some embodiments. A desktop OS may comprise software consisting of programs and data that runs on a computer and manages the computer hardware and provides common services for efficient execution of various applications. As used hereinafter, a desktop OS may comprise an OS designed to control a desktop or laptop computer, for example. Examples of a desktop OS may include, but are not limited to, Windows© 7, Windows© XP, Apple® OS X and Linux, for example. Other embodiments are described and claimed.

A mobile OS may comprise an OS operative to control a mobile device and may be similar in principle to a desktop OS but may be somewhat simpler, and deal more with the wireless versions of broadband and local connectivity, mobile multimedia formats, and different input methods associated with the smaller form factor of a mobile computing device. In various embodiments, computing device 101 may comprise a typical example of a device operative to run a mobile OS. For example, computing device 101 may comprise, in some embodiments, a smartphone, personal digital assistant (PDA), tablet computer or other suitable mobile computing device, handheld device or on-the-go device.

In some embodiments, a mobile OS may not provide all of the features available in a desktop OS or may provide different features that are geared toward the user experience associated with the form factor and available input/output devices of a mobile computing device. While the processor 108 may be capable of executing a desktop OS, this may not be a practical solution given the relatively small screen size, limited input methods and thermal constraints associated with a mobile computing device. For example, running a desktop Windows® OS on computing device 101 may be inadequate because the full featured OS may force the processor 108 to run at a high frequency which may result in overheating and the display of the computing device 101 may be inadequate to properly render the desktop OS.

In one embodiment, computing device 101 may comprise a smartphone running a mobile OS (e.g. on the left of FIG. 1A). The computing device 101 may ordinarily be used as an on-the-go device for snacking purposes such as music, e-mail and web browsing when a user is away from their laptop or desktop computer. Computing device 101 may not be sufficient to run a desktop OS in some embodiments based on the handheld form factor of device 101. For example, the power management components of a desktop OS may not be geared for a handheld device. In various embodiments, a desktop OS may require a higher processor frequency causing a handheld device such as computing device 101 to heat beyond recommended safety boundaries. For these and other reasons, it may be advantageous to couple computing device 101 to one or more of dock 110, peripherals 112-1-m and/or power supply 114 to execute a desktop OS (e.g. on the right of FIG. 1A).

In various embodiments, computing device 101 may be operative to store and execute both a mobile OS and a desktop OS. For example, computing device 101 may execute a mobile OS when the computing device 101 is used as an on-the-go or mobile device, and may execute a desktop OS when computing device 101 is docked or otherwise coupled to one or more peripherals including but not limited to a display, keyboard, printer, scanner, storage device, pointing device or mouse. Other embodiments are described and claimed.

While each of the plurality of OSs 106-1-n are shown in memory 104 in FIG. 1A for purposes of illustration, it should be understood that computing device 101 may include multiple separate memories for different OSs 106-1-n in some embodiments. In other embodiments, memory 104 may be portioned to accommodate or store the different OSs 106-1-n. In various embodiments, one or more portions of memory 104 may be available in both the first/phone and the second/docked mode. The embodiments are not limited in this context.

In various embodiments, OS management module 102 may comprise a software driver or application to manage OS 106-1-n selection and also to manage processor 108. In some embodiments, OS management module 102 may comprise a software driver running under one or more of OSs 106-1-n that controls entry into and management of different OSs 106-1-n. It should be understood that while OS management module 102 is shown as a separate component in computing device 101, it may be included in memory 104, as part of one or more of OSs 106-1-n or in any other location or configuration and still fall within the described embodiments.

In some embodiments, OS management module 102 may be operative to select a first OS 106-1-n when the mobile computing device is in a first mode or a second OS 106-1-n when the mobile computing device is in a second mode and the mobile computing device is coupled to one or more external devices 110, 112-1-m or 114. For example, in a first mode, computing device 101 may be used in a mobile mode and the first OS 106-1-n may comprise a mobile operating system. Examples of a mobile operating system may include but are not limited to Windows Mobile OS, Windows Phone 7 OS, iOS, WebOS or any other suitable mobile OS. In the second mode, the mobile computing device 101 may be coupled to dock 110, for example, and the OS management module 102 may be operative to select a desktop OS.

Dock 110 may comprise an apparatus configured to receive computing device 101 and may include a matching I/O connector to couple dock 110 to mobile computing device 101 using I/O connector 104. I/O connector 104 may comprise any connection suitable for electronically coupling computing device 101 to dock 110 or to one or more of peripherals 112-2-m. Dock 101 may be made of any suitable material, such as plastic, and may be formed such that the form factor of computing device 101 is held in place by dock 110.

In various embodiments, dock 110 may include one or more ports operative to send and receive electrical signals to and from one or more of peripherals 112-1-m. For example, dock 110 may include one or more universal serial bus (USB) ports, VGA/DVI or HDMI connectors arranged to allow computing device 101 to communicate with any of peripherals 112-1-m. In some embodiments, peripherals 112-1-m may comprise input/output devices. For example, the peripherals 112-1-m may comprise one or more of a digital display, television, keyboard, pointing device, mouse, printer, scanner, storage device or any other suitable computing device as one of ordinary skill in the art would appreciate.

Dock 110 may be operative to receive power from power supply 114 and provide power to computing device 101 in some embodiments. In various embodiments, power supply 114 may comprise an external alternating current (AC) power supply that is operative to power computing device 101 when it is coupled to dock 110 and may also be operative to charge power supply 105. In some embodiments, dock 110 may include additional cooling mechanisms or fans that may enable the computing device 101 to expand its thermal envelope when coupled to the dock 110. Other embodiments are described and claimed.

While certain embodiments are described with computing device 101 coupled to dock 110 and/or peripherals 112-1-m, it should be understood that computing device 101 is capable of operating independently when not coupled to dock 110 or peripherals 112-1-m. In other embodiments, while not shown, computing device 101 may be coupled directly to one or more of peripherals 112-1-m or power supply 114 and dock 110 may not be needed. A limited number of arrangements and elements are shown and described for purposes of illustration and not limitation.

In various embodiments, processor 108 may include a plurality of functional blocks 108-1-p. In some embodiments, OS management module 102 may be operative to select or control a first set of functional blocks for execution in a first mode and a second set of functional blocks for execution in the second mode. For example, a subset of functional blocks may be used to execute a mobile OS in a mobile mode while a different subset or all of the functional blocks may be used to execute a desktop OS in a docked mode. In various embodiments, the first set of functional blocks may be different than the second set of functional blocks and the first set of functional blocks may comprise a subset of the plurality of functional blocks 108-1-p. Other embodiments are described and claimed.

By dynamically selecting the active or operational functional blocks 108-1-p, OS management module 102 may be operative to control processor 108 such that the computing device 101 may use only the functional blocks that are necessary to provide the functionality associated with a selected mode. For example, when in a phone mode, a limited number of functional blocks may be operative to provide the computing device 101 with the capabilities necessary to execute a mobile OS and to operate processor 108 at an appropriate frequency to meet the thermal boundaries of the computing device 101. In some embodiments, unused or unnecessary functional blocks may be power gated, clock gated, turned off, suspended or other placed in a low power state. In some embodiments, the OS management module 102 may be operative to apply clock gating to one or more of the plurality of functional blocks 108-1-p that are not included the first set of functional blocks when the mobile computing device is in the first mode or one or more of the plurality of functional blocks 108-1-p not included in the second set of functional blocks when the mobile computing device is in the second mode. The embodiments are not limited in this context.

Figure 1B:
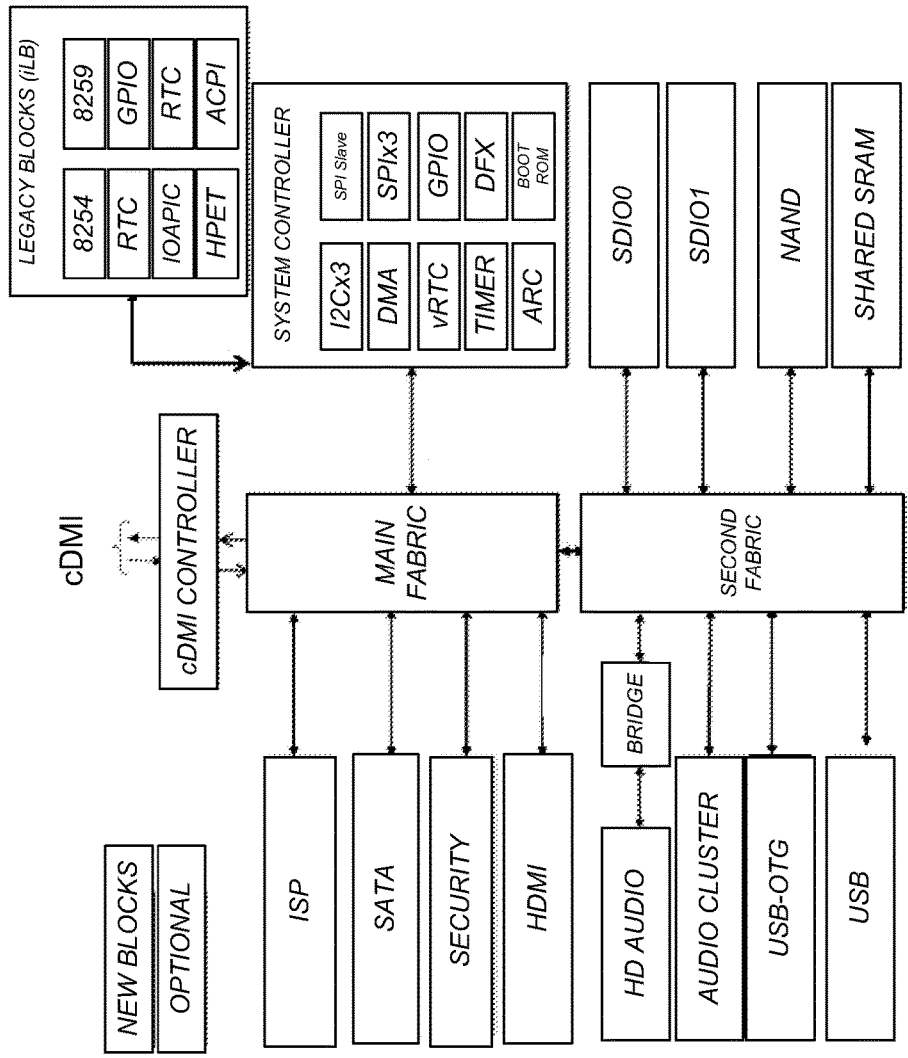
FIG. 1B illustrates one embodiment of an apparatus.

FIG. 1B illustrates one embodiments of an apparatus 150. Apparatus 150 may comprise one embodiment of a processor 108 including a plurality of functional blocks 108-1-p. While a limited number, type and arrangement of functional blocks are shown in processor 150, it should be understood that any number, type or arrangement of functional blocks, components or elements could be used and still fall within the described embodiments. In various embodiments, one or more functional blocks of processor 150 may be clock gated when mobile computing device 101 is in a first mode, phone mode or is otherwise not coupled to dock 110, peripherals 112-1-*m* and/or power supply 114. For example, SATA, HDMI and HD AUDIO may not be needed by computing device 101 when operating in the first mode. As a result, these functional blocks may be clock gated and processor 150 may be operated at a lower frequency, consume less power, and generate less heat in the first mode. Other embodiments are described and claimed.

In some embodiments, the OS management module 102 may be operative to switch from the first mode to the second mode when the mobile computing device 101 is coupled to the one or more external devices 110, 112-1-*m*, 114 or a request to initiate the second mode is received. For example, computing device 101 may be operating in first/phone mode when the device 101 is coupled to dock 110. In some embodiments, this coupling may automatically initiate a transition into second/docked mode and OS management module 102 may select the desktop OS and may bring up any clock gated functional blocks that are needed to execute the second/desktop mode/OS.

In various embodiments, the coupling of the computing device 101 and the dock 110 alone may not be sufficient for initiating a transition from the first mode to the second mode. For example, in some embodiments a user may choose to simply couple computing device 101 to dock 110 to charge power supply 105 and may not wish transition from the first mode to the second mode. In some embodiments, dock 110 may include a button, switch, toggle or other activator 111 that is operative to initiate the transition between the first mode and the second mode. For example, a user may couple computing device 101 to dock 110 and press button 111 to initiate the transition into docked mode. In some embodiments, dock 110 may also include indicators 113 that may comprise LED lights or other suitable means for indicating which mode the computing device 101 is current operating in. The embodiments are not limited in this context.

In some embodiments, the OS management module 102 may be operative to switch from the second mode to the first mode when the mobile computing device 101 is decoupled from the one or more external devices 110, 112-1-*m*, 114 or a request to initiate the first mode is received. For example, when computing device 101 is removed from dock 110, OS management module 102 may automatically initiate a return to the first/phone mode. In other embodiments, phone mode may be resumed while computing device 101 is still coupled to dock 110 based on request to return to phone mode, such as a notification of a button press 111 or an incoming voice call such as a call over a managed circuit-switched cellular network, for example. Various embodiments may also include an indicator or notice presented to a user of computing device 101 that requires user interaction on device 101 to initiate the transition to phone mode. For example, after a user removes computing device 101 from dock 110, a notice may be presented to the user on the screen of the computing device 101. Some embodiments may require the user to accept this notice to authorize the switching of modes. Other embodiments are described and claimed.

In some embodiments, computing device 101 may include one or more wireless transceivers 110 operative to enable wireless communication for the mobile computing device in the first mode and the second mode. For example, computing device 101 may be operative as a wireless or cellular telephone in the phone mode, and this capability may also be available in the docked mode despite the mode/OS change. For example, while in the second/docked mode, computing device 101 may be capable of sending and receiving voice calls or performing other wireless functions typically associated with the first/phone mode. The embodiments are not limited in this context.

While FIG. 1A shows computing device 101 being physically coupled to dock 110, it should be understood that a physical connection is not required in some embodiments. For example, in various embodiments a computing device 101 may be wirelessly connected to dock 110 or one or more of peripherals 112-1-*m* using a Bluetooth or other wireless connection. Other embodiments are described and claimed.

Embodiments for utilizing multiple OSs may be implemented using a number of different approaches. For example, some embodiments may include independently booting each operating system each time that it is needed or each time that the computing device 101 changes modes. This approach, while effective, may be impractical given the time associated with loading or booting an OS each time a mode change is desired and the lack of cross-platform accessibility of features. For example, wireless phone capabilities available in the first mode using the mobile OS may not be available in the second mode using the desktop OS using this dual boot approach.

Other embodiments may include virtualization. In some embodiments, computing device 101 or OS management module 102 may include a hypervisor in some embodiments that enables an OS to run as a guest OS within a primary OS or within the hypervisor. For example, mobile OS may comprise a primary OS for computing device 101, and the desktop OS may run as a guest OS within the hypervisor to allow access to the desktop OS functionality. While effective, this approach may also have certain limitations such as performance and device sharing issues.

Figure 2:
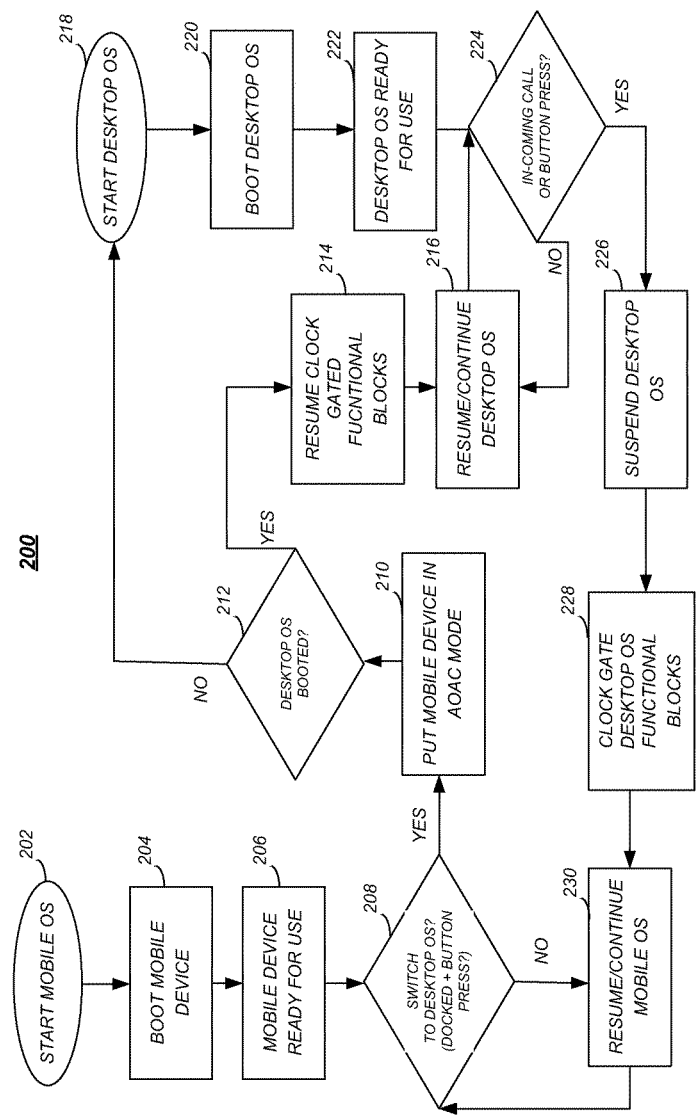
FIG. 2 illustrates one embodiment of a first logic diagram.

Various embodiments may comprise a firmware approach to utilizing multiple OSs on a mobile computing device 101. The firmware approach may comprise or form part of the device 101 architecture. The firmware approach may, in some embodiments, allow multiple OSs to run directly (e.g. not using a hypervisor) on the device 101 hardware and may also allow for the simultaneous running of multiples OSs. One embodiments of the logic associated with a firmware approach is illustrated in FIG. 2. The embodiments are not limited in this context.

While certain embodiments are described in terms of a module, logic, software or thread, it should be understood that any number of modules, threads or arrangement of logic and any number of cores of a multi-core processor can be used and still fall within the described embodiments. Furthermore, it should be understood that in some embodiments that logic described herein may be implemented or arranged to perform tasks in parallel, including processing a plurality of tasks or applications and controlling a plurality of cores at substantially the same time. Moreover, it should also be understood that the logic flows described herein depict only examples of logic flows and that different numbers, orders and/or arrangements of the operations described in the logic flows could be implemented and still fall within the described embodiments. Other embodiments are described and claimed.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe mode/OS switching features described above with reference to FIGS. 1A and 1B. In various embodiments, for purposes of illustration and not limitation, the logic flow 200 may assume that a computing device contains two separate operating system as described above with reference to FIG. 1A. In some embodiments, the separate operating systems may comprise a mobile OS and a desktop OS. Other embodiments are described and claimed.

At 202, the mobile OS may be started. For example, when turning on or booting up computing device 101, if the device is not connected to any peripherals 110, 112-1-m, 114, the default may be to bring the device 101 into a mobile mode. At 204 the mobile device is booted and at 206 the device is ready for use. At this point, in some embodiments, the device 101 may be ready to independently function as a mobile computing device or on-the-go device. At 208, in various embodiments, a determination whether a switch to a desktop OS is desired may be performed. For example, computing device 101 or OS management module 102 may determine if computing device 101 has been coupled to dock 110 and/or a button press 111 notification has been received. If not, at 230 the computing device 101 continues in the first mode using the mobile OS and performs periodic checks for a request to change modes.

In various embodiments, if a request to change modes is detected at 208, the mobile device 101 may be placed in an always on, always connected (AOAC) mode at 210. Thereafter, at 212, a determination is made whether or not a desktop OS has been booted. If yes, functional blocks of a processor of the computing device that were clock gated for operation of the mobile OS may be resumed or brought back at 214 and the desktop OS may be resumed at 216. If not, the desktop OS may be started at 218, booted at 220 and at 222 the computing device may be ready for use using the desktop OS at 222.

At 224, in some embodiments, with the computing device operating in the second mode running the desktop OS, a determination may be made whether an in-coming call or button press is received. For example, while in the second mode, computing device 101 may still be operative to receive voice calls or other wireless communications associated with the first/phone mode. In some embodiments, a button press on dock 110 may be used while in the second mode to answer a voice call or otherwise revert to the first mode or to resume any functionality of the first mode. If no in-coming call or button press is detected at 224, the computing device continues in the second mode using the desktop OS at 216.

In various embodiments, if an in-coming call or button press is detected at 224, the computing device suspends the desktop OS at 226, clock gates functional blocks of the processor that were used to execute the desktop OS but are not needed for the mobile OS at 228 and resumes the mobile OS at 230. While a limited number and arrangement of steps are shown for purposes of illustration, one skilled in the art would understand that steps do not to be executed in the order presented in FIG. 2 and additional or fewer steps could be used and still fall within the described embodiments.

Figure 3:
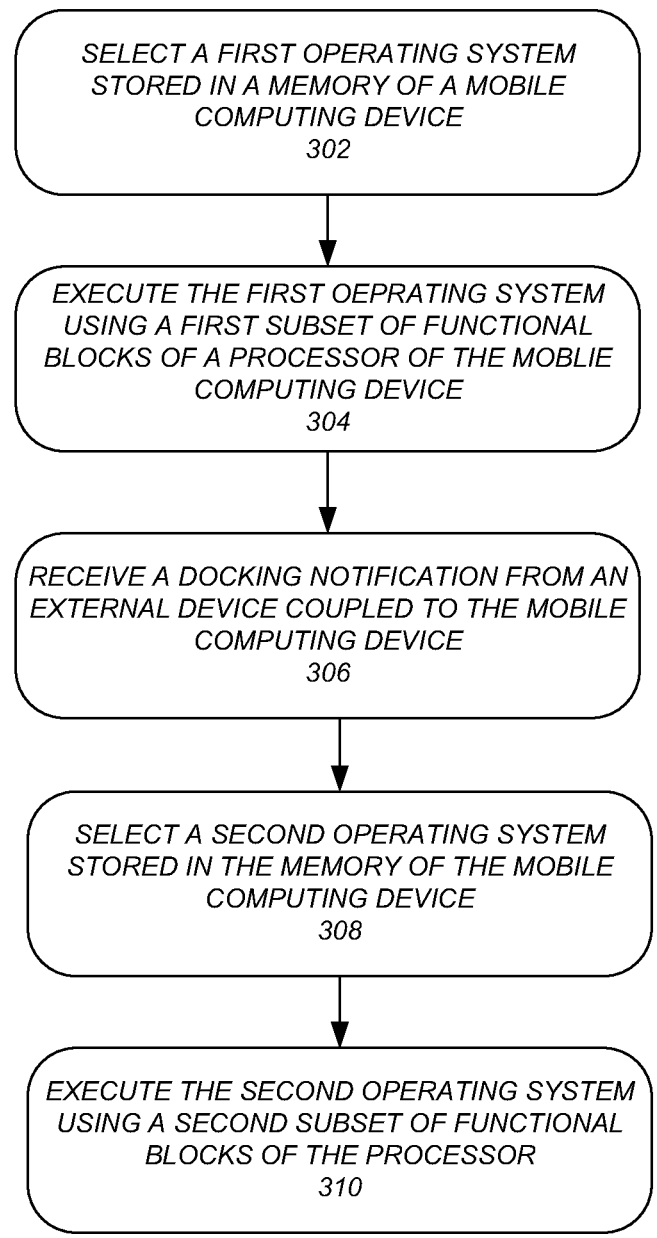
FIG. 3 illustrates one embodiment of a second logic diagram.

FIG. 3 illustrates one embodiment of a second logic flow 300. As described above with reference to logic flow 200, the logic flow 300 may be performed by various systems and/or devices and may be implemented as hardware, software, firmware, and/or any combination thereof, as desired for a given set of design parameters or performance constraints. For example, one or more operations of the logic flow 300 may be implemented by executable programming or computer-readable instructions to be executed by a logic device (e.g., computer, processor).

In one embodiment, a first operating system stored in a memory of a mobile computing device may be selected at 302. For example, OS management module 102 may select on of OSs 106-1-n. At 304, in various embodiments, the first operating system may be executed using a first subset of functional blocks of a processor of the mobile computing device. For example, OS management module 102 may select one or more of functional blocks 108-1-p of processor 108 to execute the first OS. In some embodiments, a docking notification may be received from an external device coupled to the mobile computing device at 306. For example, computing device 101 may be coupled with dock 110 and a notification of the successful coupled may be received by computing device 101.

In various embodiments, a second operating system stored in the memory of the mobile computing device may be selected at 308 and the second operating system may be executed using a second subset of functional blocks of the processor at 310. For example, OS management module 102 may select a second OS, different from the first OS, and may execute the second OS using a second set of functional blocks 108-1-p of processor 108. In some embodiments, the first operating system may comprise a mobile operating system and the second operating system may comprise a desktop operating system. The embodiments are not limited in this context.

A first mode of operation may be entered or selected using the first operating system in some embodiments. For example, in a first mode of operation (e.g. on the left of FIG. 1A), computing device 101 may be operative for mobile use using a mobile OS and may be operative to receive power from an internal power supply 105 in the first mode of operation. In other embodiments, a second mode of operation may be entered or selected using the second operating system. For example, in a second mode of operation (e.g. on the right of FIG. 1A), computing device 101 may be coupled to one ro more peripherals 110, 112-1-m, 114 and may be operative for desktop use using a desktop OS and may be operative to receive power from an external power supply 114 in the first mode of operation. Other embodiments are described and claimed.

In some embodiments, a switch from the first mode of operation to the second mode of operation may be performed when the mobile computing device is coupled to one or more external devices and switching from the second mode of operation to the first mode of operation when the mobile computing device is decoupled from the one or more external devices. For example, when computing device 101 is coupled to dock 110, a switch from the first mode/mobile OS to the second mode/desktop OS may be performed. Likewise, in various embodiments, when the mobile computing device 101 is decoupled or removed from dock 110, a switch from the second/desktop mode to the first/phone/mobile mode may be performed.

In various embodiments, one or more functional blocks not included the first set of functional blocks in the first mode or one or more functional blocks not included in the second set of functional blocks in the second mode may be clock gated. For example, to conserve power and reduce heat generation, functional blocks not needed for execution of the mobile OS may be clock gated, power gated, turned off or otherwise placed in a low power mode in the first mode of operation. These functional blocks may be brought back or powered on when needed for the second mode. Other embodiments are described and claimed.

In some embodiments, the mobile computing device may be coupled to a dock and a request to initiate the second mode of operation may be received. For example, mobile computing device 101 may be coupled to dock 110 and a button press 111 may be received initiating a user's desire to switch from the mobile mode to the desktop mode. In various embodiments, one or more information signals may be sent or received to or from the mobile computing device to one or more peripheral devices coupled to the dock to display or control the second operating system. For example, when coupled to dock 110, computing device 101 may be operative to control one or more of peripherals 112-1-*m*. In some embodiments, for example, one peripheral may comprise a display to display an output from computing device 101, one peripheral may comprise a keyboard and/or mouse to control the computing device 101 or any other suitable peripheral may be used as one of skill in the art would understand.

While certain embodiments are described with respect to a specific arrangement of nodes, modules, components, elements or logic, it should be understood that these examples are provided for purposes of illustration and not limitation. Any number, type and/or arrangement of components, modules, application types and file types can be used and still fall within the described embodiments. Other embodiments are described and claimed.

Figure 4:
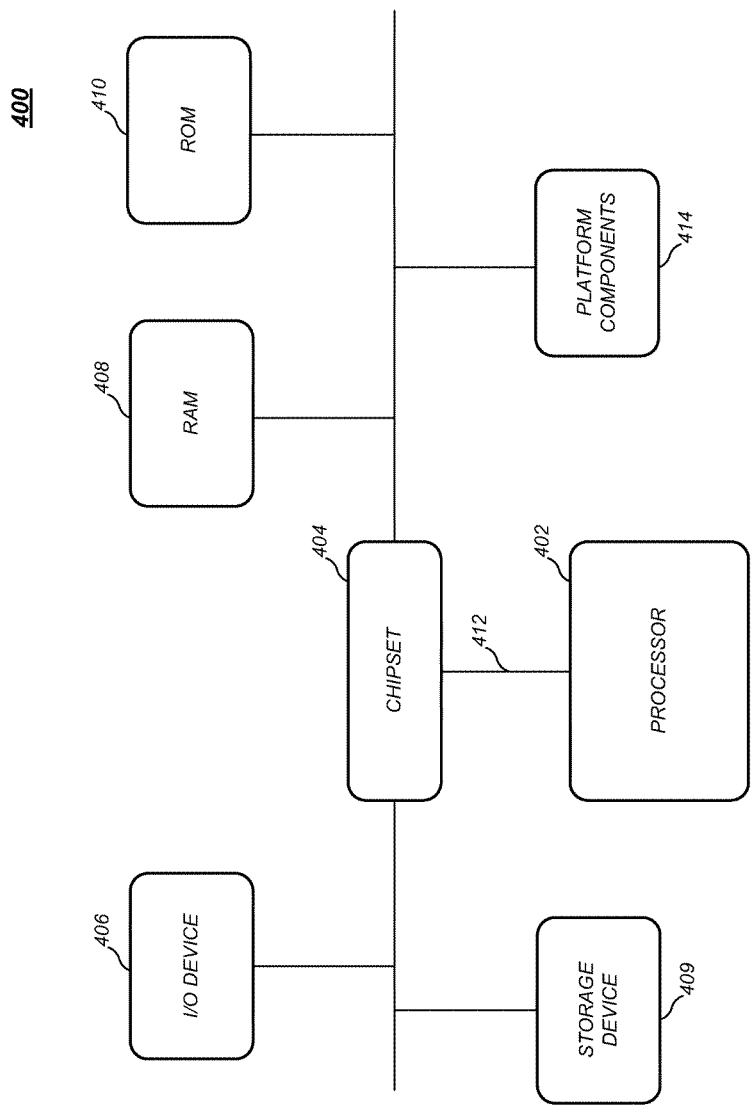
FIG. 4 illustrates one embodiment of a second system.

FIG. 4 is a diagram of an exemplary system embodiment. In particular, FIG. 4 is a diagram showing a system 400, which may include various elements. For instance, FIG. 4 shows that system 400 may include a processor 402, a chipset 404, an input/output (I/O) device 406, a random access memory (RAM) (such as dynamic RAM (DRAM)) 408, and a read only memory (ROM) 410, storage device 409 and various platform components 414 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 4, I/O device 406, RAM 408, storage device 409 and ROM 410 are coupled to processor 402 by way of chipset 404. Chipset 404 may be coupled to processor 402 by a bus 412. Accordingly, bus 412 may include multiple lines. In various embodiments, storage device 409 may comprise a non-volatile storage device or memory. Other embodiments are described and claimed.

Processor 402 may be a central processing unit comprising one or more processor cores and may include any number of processors having any number of processor cores. The processor 402 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 400 may include various interface circuits, such as an Ethernet interface and/or a Universal Serial Bus (USB) interface, and/or the like. In some exemplary embodiments, the I/O device 406 may comprise one or more input devices connected to interface circuits for entering data and commands into the system 400. For example, the input devices may include a physical or virtual/soft keyboard, mouse, touch screen, track pad, track ball, isopoint, a voice recognition system, and/or the like. Similarly, the I/O device 406 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), personal display glasses (PDG), pico projectors, or any other type of display.

The system 400 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media (e,g, SSD, eMMC, SD, UFS), erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   at least one non-volatile memory operative to store firmware comprising at least a portion of a first operating system and at least a portion of a second operating system;
   a multi-core processor operative to execute the first operating system and the second operating system, the multi-core processor comprising a plurality of functional blocks, wherein each of the plurality of functional blocks comprises a core of the multi-core processor; and
   an operating system (OS) management module comprising a hypervisor, the OS management module operative to:
      select the first operating system when the mobile computing device is in a first mode or select the second operating system when the mobile computing device is in a second mode and the mobile computing device is coupled to one or more external devices;
      select a first set of functional blocks from the plurality of functional blocks for activation in the first mode or select a second set of functional blocks of the plurality of functional blocks for activation in the second mode;
      activate an always on, always connected (AOAC) mode responsive to switching from the first mode to the second mode;
      send a first control signal to activate the first set of functional blocks of the plurality of functional blocks; and
      send a second control signal to boot the first operating system when the mobile computing device is in the first mode or send a third control signal to boot the second operating system when the mobile computing device is in the second mode.

2. The mobile computing device of claim 1, wherein the first operating system comprises a mobile operating system and the second operating system comprises a desktop operating system.

3. The mobile computing device of claim 1, wherein at least one of the first set of functional blocks is different than at least one of the second set of functional blocks and the first set of functional blocks comprises a subset of the plurality of functional blocks.

4. The mobile computing device of claim 3, wherein the operating system management module is operative to apply clock gating to one or more of the plurality of functional blocks that are not included in the first set of functional blocks when the mobile computing device is in the first mode or one or more of the plurality of functional blocks not included in the second set of functional blocks when the mobile computing device is in the second mode.

5. The mobile computing device of claim 1, wherein the operating system management module is operative to automatically switch from the first mode to the second mode when the mobile computing device is coupled to the one or more external devices or a request to initiate the second mode is received.

6. The mobile computing device of claim 1, wherein the operating system management module is operative to automatically switch from the second mode to the first mode when the mobile computing device detects an incoming voice call.

7. The mobile computing device of claim 1, comprising:
one or more wireless transceivers operative to enable cellular communication for the mobile computing device in the first mode and the second mode.

8. A computer-implemented method, comprising:
selecting a first operating system stored in a memory of a mobile computing device, the memory comprising at least one non-volatile memory operative to store firmware comprising at least a portion of the first operating system and at least a portion of a second operating system;
sending a first control signal to execute the first operating system using a first subset of functional blocks of a plurality of functional blocks of a multi-core processor of the mobile computing device, wherein each of the plurality of functional blocks comprises a core of the multi-core processor and at least one of the cores comprising a virtual processor core;
receiving a docking notification from an external device coupled to the mobile computing device;
selecting the second operating system responsive to the docking notification;
sending a second control signal to execute the second operating system using a second subset of functional blocks of the plurality of functional blocks of the multi-core processor; and
activating an always on, always connected (AOAC) mode responsive to switching from the first operating system to the second operating system.

9. The computer-implemented method of claim 8, wherein the first operating system comprises a mobile operating system and the second operating system comprises a desktop operating system.

10. The computer-implemented method of claim 8, comprising:
entering a first mode of operation using the first operating system;
receiving power from an internal power supply in the first mode of operation;
entering a second mode of operation using the second operating system; and
receiving power from an external power supply in the second mode of operation.

11. The computer-implemented method of claim 10, comprising:
switching from the first mode of operation to the second mode of operation when the mobile computing device is coupled to one or more external devices and switching from the second mode of operation to the first mode of operation when the mobile computing device is decoupled from the one or more external devices or coupled with the one or more external devices and detects an incoming voice call.

12. The computer-implemented method of claim 10, comprising:
clock gating one or more functional blocks not included in the first subset of functional blocks in the first mode or one or more functional blocks not included in the second subset of functional blocks in the second mode.

13. The computer-implemented method of claim 10, comprising:
coupling the mobile computing device to a dock;
receiving a request to initiate the second mode of operation; and
sending or receiving one or more information signals to or from the mobile computing device to one or more peripheral devices coupled to the dock to display or control the second operating system.

14. An article comprising a non-transitory computer-readable storage medium containing instructions that if executed by a processor enable a system to:
select a mobile operating system for a mobile computing device when the mobile computing device receives power from an internal power supply, the mobile computing device comprising a memory, the memory comprising at least one non-volatile memory operative to store firmware comprising at least a portion of the mobile operating system and at least a portion of a desktop operating system;
send a control signal to execute the mobile operating system using a first subset of functional blocks of a plurality of functional blocks of a multi-core processor of the mobile computing device, wherein each of the plurality of functional blocks comprises a core of the multi-core processor and at least one of the cores comprising a virtual processor core;
clock gate functional blocks of the processor that are not part of the first subset of functional blocks;
select the desktop operating system for the mobile computing device when the mobile computing device receives power from an external power supply; and
send a control signal to shutdown the mobile operating system and to execute the desktop operating system using a second subset of functional blocks of the processor activating an always on, always connected (AOAC) mode responsive to switching from the mobile operating system to the desktop operating system.

15. The article of claim 14, comprising instructions that if executed enable the system to:
enter a first mode of operation using the mobile operating system; and
enter a second mode of operation using the desktop operating system;
wherein the first mode of operation comprises a phone mode and the second mode of operation comprises a dock mode.

16. The article of claim 15, comprising instructions that if executed enable the system to:
switch from the first mode of operation to the second mode of operation when the mobile computing device is coupled to one or more external devices; and
switch from the second mode of operation to the first mode of operation when the mobile computing device is decoupled from the one or more external devices or detects an incoming voice call.

17. The article of claim 15, comprising instructions that if executed enable the system to:
receive a request to initiate the second mode of operation; and send or receive one or more information signals to or from the mobile computing device to one or more peripheral devices external to the mobile computing device to display or control the second operating system.

18. The mobile computing device of claim 1, wherein the first operating system comprises a desktop operating system and the second operating system comprises a desktop operating system different than first operating system.

19. The mobile computing device of claim 1, wherein the second set of the plurality of functional blocks includes at least one of the plurality of functional blocks not included in the first set of the plurality of functional blocks.

20. The mobile computing device of claim 1, the operating system management module operative to:

select a first set of the plurality of functional blocks for execution by the first operating system in the first mode or select a second set of the plurality of functional blocks for execution by the second operating system in the second mode; and place one or more of the plurality of functional blocks not included in the second set of functional blocks in a low power state when in the second mode.

21. The mobile computing device of claim 1, at least a portion of the second set of functional blocks comprising a high definition (HD) audio functional block and a serial AT attachment (SATA) functional block.

22. The mobile computing device of claim 1, the at least one non-volatile memory comprising a read-only memory (ROM).

23. The article of claim 14, at least a portion of the second subset of functional blocks comprising a high definition (HD) audio functional block and a serial AT attachment (SATA) functional block.

* * * * *